Figure 1:
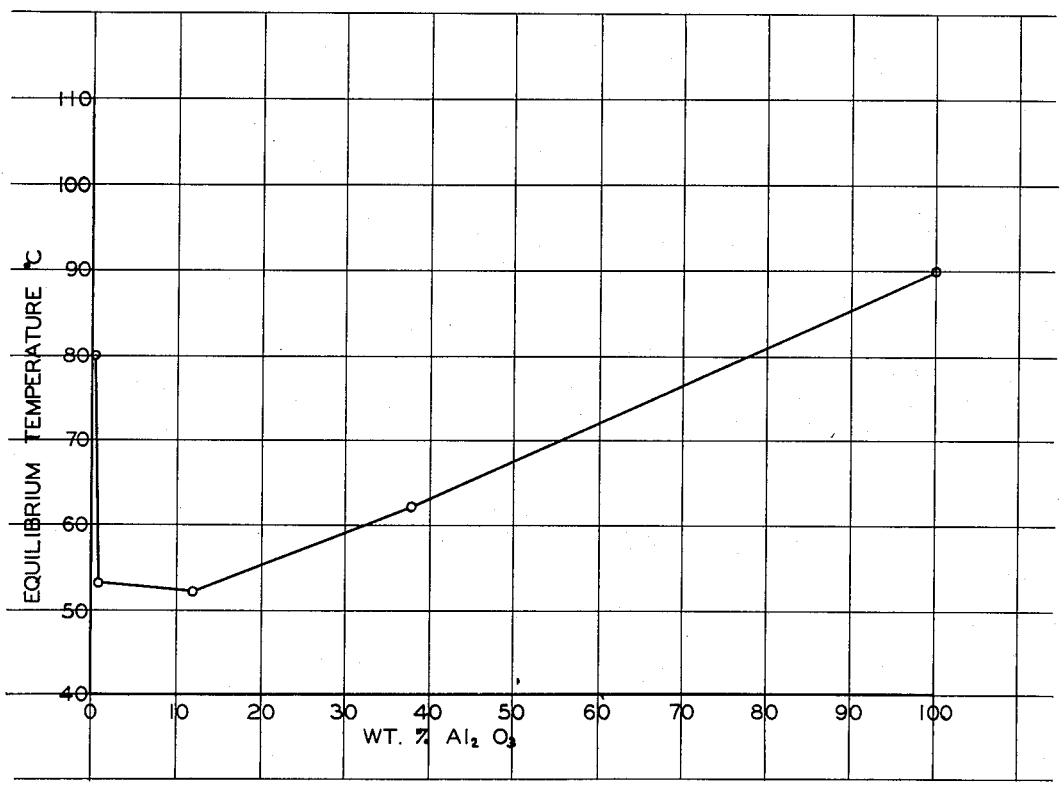

Nov. 1, 1955    R. J. ZELLNER ET AL    2,722,552
METHOD OF DEPOLYMERIZING PARALDEHYDE
Filed July 21, 1954

INVENTORS
ROBERT J. ZELLNER
BY  PHILIP J. EHMAN

ATTORNEY

United States Patent Office 2,722,552
Patented Nov. 1, 1955

2,722,552

METHOD OF DEPOLYMERIZING PARALDEHYDE

Robert J. Zellner and Philip J. Ehman, Marinette, Wis., assignors to Ansul Chemical Company, Marinette, Wis., a corporation of Wisconsin Application July 21, 1954, Serial No. 444,794

4 Claims. (Cl. 260—601)

This invention relates to a method of depolymerizing paraldehyde. More specifically, the invention relates to dissociating paraldehyde to acetaldehyde in the presence of a catalyst. The storing and handling of acetaldehyde presents a considerable hazard. It has a boiling point of 21° C. and a flash point of —40° F. A much safer source is a trimer of acetaldehyde, called paraldehyde. This trimer boils at 125° C. and has a flash point of 95° F. This trimer can be depolymerized to acetaldehyde by the addition of small amounts of mineral acid such as sulfuric.

In using this acid depolymerization process it was found that considerable charring occurred. In attempts to find a more suitable depolymerizing agent we have discovered that a silica-alumina cracking catalyst, containing about 10 to 15 per cent by weight alumina, has remarkable activity. We found that silica-alumina catalysts containing from about 1 to 15 per cent by weight aluminum oxide gave the maximum rate of depolymerization, but a range of 0.5 to 80 per cent aluminum oxide is also effective. Pure silica gel and aluminum oxide both showed some activity but mixtures of the two proved more effective than either alone. This is shown in the accompanying Figure 1 of a graph, in which the weight per cent of aluminum oxide is plotted against the equilibrium temperature, which is the maximum temperature obtained during heating of paraldehyde for 15 minutes in contact with the depolymerizing agent. This temperature is a measure of depolymerization rate.

The apparatus for these tests consisted of a one liter round bottom flask heated with a heating mantle. Paraldehyde was fed to the flask from a graduated separatory funnel. Fifty grams of a silica-alumina cracking catalyst were placed in the flask. Properties of the catalyst are listed in the following table:

Table $Al_2O_3$, 12%; surface area 300 sq. meters/gm.
$SiO_2$, 85.5%; true density 2.4 gm./cc.
$H_2O$, 2.0%; bulk density 0.62 gm./cc.
Others, 0.5%; size—cylinders ⅛ in. dia. x ⅛ in. long Best operation was obtained when sufficient paraldehyde was maintained in the flask to just cover the catalyst. With fresh catalyst operating temperature was 45° C. As the catalyst aged this operating temperature rose gradually to 70° C. Four hundred to 450 grams of paraldehyde per hour were dissociated easily with this apparatus. Catalyst life was in excess of 60 grams of paraldehyde per gram of catalyst.

Our invention provides an efficient method for economically dissociating paraldehyde to acetaldehyde by contacting the paraldehyde with the catalyst as previously described and then heating the reaction mixture to separate the acetaldehyde thus produced from about 45 to 80 C.

Changes and modifications may be made in our described process which are intended to be included within the scope of the appended claims.

We claim:

1. A method of dissociating paraldehyde to acetaldehyde which comprises contacting paraldehyde with an alumina-silica catalyst containing 0.5 to 80% by weight of alumina and separating the acetaldehyde from the reaction mixture.

2. A method of dissociating paraldehyde to acetaldehyde which comprises contacting paraldehyde with an alumina-silica catalyst containing 0.5 to 80% by weight of alumina and heating the reaction mixture to separate the acetaldehyde formed.

3. A method of dissociating paraldehyde to acetaldehyde which comprises contacting paraldehyde with an alumina-silica catalyst containing 1 to 15% by weight of alumina and separating the acetaldehyde from the reaction mixture.

4. A method of dissociating paraldehyde to acetaldehyde which comprises contacting paraldehyde with an alumina-silica catalyst containing 1 to 15% by weight of alumina, and heating the reaction mixture at a temperature of 45° to 80° C. to separate the acetaldehyde formed.

No references cited.